United States Patent
Seger et al.

(10) Patent No.: US 9,756,229 B2
(45) Date of Patent: Sep. 5, 2017

(54) MODULE DEVICE FOR A CAMERA SYSTEM, RETAINING SPRING DEVICE AND CORRESPONDING CAMERA SYSTEM

(71) Applicant: Robert Bosch GmbH, Stuttgart (DE)

(72) Inventors: Ulrich Seger, Leonberg-Warmbronn (DE); Nikolai Bauer, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/377,821

(22) PCT Filed: Jan. 23, 2013

(86) PCT No.: PCT/EP2013/051203
§ 371 (c)(1),
(2) Date: Aug. 8, 2014

(87) PCT Pub. No.: WO2013/117430
PCT Pub. Date: Aug. 15, 2013

(65) Prior Publication Data
US 2015/0146094 A1    May 28, 2015

(30) Foreign Application Priority Data
Feb. 10, 2012   (DE) .................. 10 2012 201 984
Jan. 22, 2013   (DE) .................. 10 2013 200 966

(51) Int. Cl.
*H04N 5/225*    (2006.01)
*G03B 17/55*    (2006.01)
(Continued)

(52) U.S. Cl.
CPC ........... *H04N 5/2254* (2013.01); *B60R 11/04* (2013.01); *G03B 17/55* (2013.01); *H04N 5/2252* (2013.01);
(Continued)

(58) Field of Classification Search
None
See application file for complete search history.

(56) References Cited

U.S. PATENT DOCUMENTS

2004/0075870 A1*  4/2004  Karaki ................. H04N 1/21
                                                   358/296
2006/0067678 A1*  3/2006  Senba .................. G03B 17/00
                                                   396/529
(Continued)

FOREIGN PATENT DOCUMENTS

DE   10 2007 017238   10/2008
DE   10 2008 001675   11/2009
(Continued)

*Primary Examiner* — Justin P Misleh
(74) *Attorney, Agent, or Firm* — Norton Rose Fulbright US LLP; Gerard Messina

(57) ABSTRACT

A module device for a camera system having a housing device, which is provided with an inner opening and configured to allow an adjustment of an installation position of the module device in a motor vehicle; it also includes a sensor holder device which has an upper region and a base region, is coupled to the housing device via at least one support element and configured to accommodate an image sensor; a lens apparatus which is coupled to the sensor holder device in the upper region via at least one connection element and configured to generate an optical image on the image sensor; and a retaining spring device which is coupled to the housing device and the base region of the sensor holder device and is configured to press the image sensor against the sensor holder device.

19 Claims, 7 Drawing Sheets

(51) Int. Cl.
*B60R 11/04* (2006.01)
*G03B 17/28* (2006.01)
*B60R 11/00* (2006.01)

(52) U.S. Cl.
CPC ......... *H04N 5/2253* (2013.01); *H04N 5/2257* (2013.01); *B60R 2011/0026* (2013.01); *B60R 2300/00* (2013.01); *G03B 17/28* (2013.01); *G03B 2217/002* (2013.01)

(56) References Cited

U.S. PATENT DOCUMENTS

| | | | | |
|---|---|---|---|---|
| 2008/0316344 | A1* | 12/2008 | Yamamiya | G02B 7/09 348/294 |
| 2009/0190915 | A1* | 7/2009 | Leonelli, Jr. | G03B 17/00 396/419 |
| 2010/0059664 | A1* | 3/2010 | Aiba | G03B 17/00 250/238 |
| 2011/0242762 | A1* | 10/2011 | Kato | G03B 17/55 361/704 |
| 2012/0013741 | A1* | 1/2012 | Blake, III | B60R 11/00 348/148 |
| 2014/0061438 | A1* | 3/2014 | Rohde | H04N 5/2251 250/208.1 |

FOREIGN PATENT DOCUMENTS

| | | |
|---|---|---|
| DE | 10 2009 056200 | 7/2010 |
| JP | 61128874 U | 8/1986 |
| JP | 6224572 U | 2/1987 |
| JP | H0611679 A | 1/1994 |
| JP | H11341321 A | 12/1999 |
| JP | 2001158988 A | 6/2001 |
| JP | 2005512876 A | 5/2005 |
| JP | 2006091177 A | 4/2006 |
| JP | 2006091464 A | 4/2006 |
| JP | 2006 222776 | 8/2006 |
| JP | 2006222776 A * | 8/2006 |
| JP | 2007 166006 | 6/2007 |
| JP | 2007166006 A * | 6/2007 |
| JP | 2008046169 A | 2/2008 |
| JP | 2008245144 A | 10/2008 |
| JP | 2009040270 A | 2/2009 |
| JP | 2010152037 A | 7/2010 |
| JP | 2010205916 A | 9/2010 |

* cited by examiner

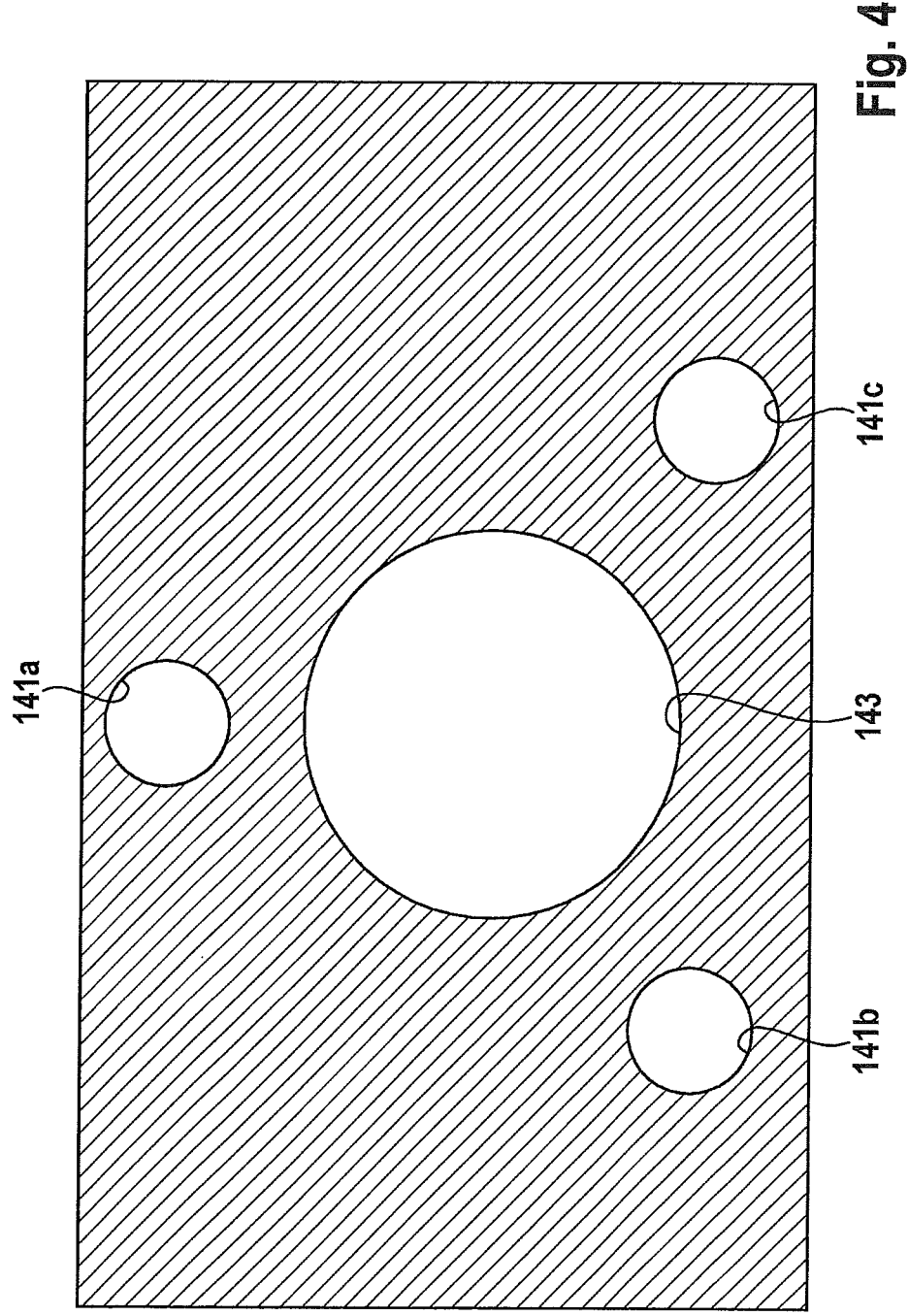

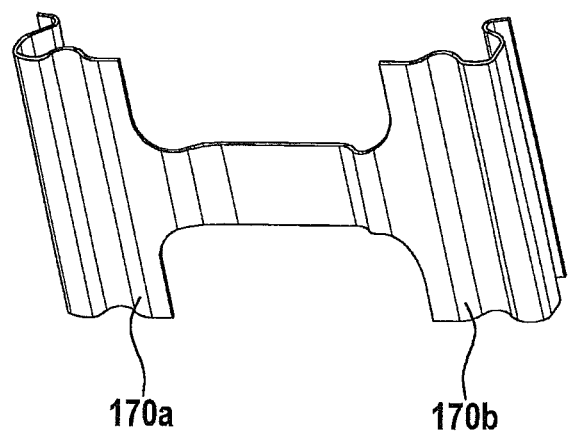
170a    170b    Fig. 5c
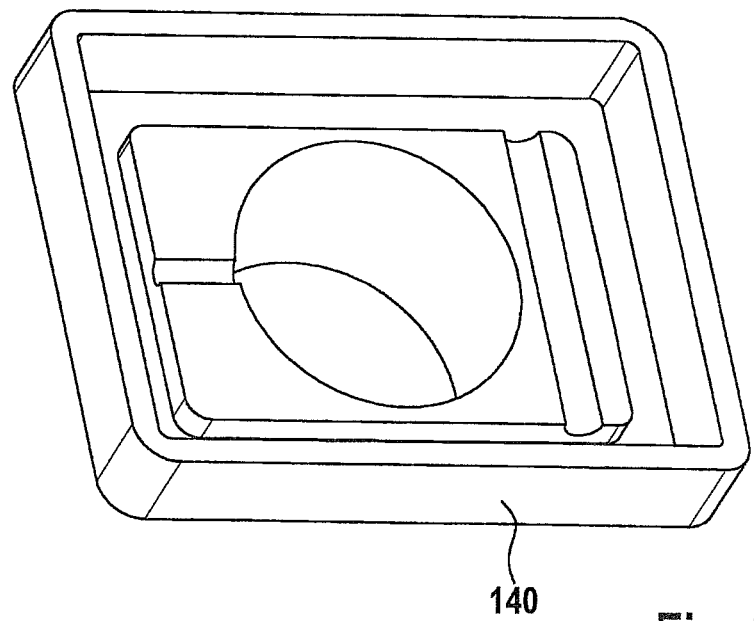
140    Fig. 5d

MODULE DEVICE FOR A CAMERA SYSTEM, RETAINING SPRING DEVICE AND CORRESPONDING CAMERA SYSTEM

FIELD OF THE INVENTION

The present invention relates to a module device for a camera system, a retaining spring device and a corresponding camera system.

BACKGROUND INFORMATION

The document DE 10 2009 056 200 A1 discusses a camera module for a vehicle, which includes a camera, especially a video camera, which can be used to at least record moving images of the surroundings of the camera module, and a housing, in which the camera is at least sectionally accommodated and which has a through opening through which the moving images can be recorded with the aid of the camera; on an end face of the housing pointing toward the surroundings, a sealing element is provided in the region of the through opening, which surrounds the through opening and is connected to the housing. Also provided is a securing system of such a camera module on a holder module of a vehicle.

The printed publication DE 10 2008 001 675 A1 discusses a camera module for the recording of image data, especially for use in the automotive sector. The camera module includes at least one image sensor chip, in particular a non-encapsulated image sensor chip. Moreover, the camera module encompasses at least one Peltier element having at least one cooling surface. The image sensor chip is connected to the cooling surface by at least one heat collection element, especially at least one heat collection foil.

The German document DE 10 2007 017 238 A1 discusses a camera module, especially for a vehicle, which includes at least one housing having a housing interior space and an optical module, which is situated in the interior space of the housing; it also has a circuit board including an image-recording chip and electrical contactings. The optical module is pointing toward an exterior space outside the housing, through an optical exit, and the electrical contactings are routed from the optical module to the outside via through openings in the housing for contact with the camera module, the through openings being sealed by glass seals and electrical insulation of the contacts being provided. The housing interior space is hermetically sealed from the outside space, and the housing has at least two housing parts, which are connected to one another by a hermetically tight connection, such as a welding connection or a soldered connection.

FIG. 6 shows a housing module 40 for a camera module 10 by way of example. Module devices for camera systems are constructed from individual subsystems.

Housing module 40 of camera module 10 shown in FIG. 6 by way of example can be connected to support elements 31a-31b of an image sensor module 30 by locking devices 41a-41b. Image sensor module 30 is configured to accommodate an image sensor 50 and allows a lens module 20 to be accommodated in an inner opening 30a, lens module 20 having a multitude of optical lenses 61, 62, 63, 64 and generating a real optical image of an object on image sensor 50.

SUMMARY OF THE INVENTION

The present invention provides a module device for a camera system having the features described herein, a camera system for a motor vehicle as described herein, and a retaining spring device having the features described herein.

A module device for a camera system is therefore provided in the present invention, which has a housing device which includes an inner opening and is configured to allow an adjustment of an installation position of the module device in a motor vehicle; it also has a sensor holder device, which has an upper region and a base region and is coupled to the housing device via at least one support element and configured to accommodate an image sensor; a lens apparatus, which is coupled to the sensor retaining device in the upper region via at least one connecting element and is configured to generate an optical image on the image sensor; as well as a retaining spring device, which is coupled to the base region of the sensor holder device and configured to press the image sensor with the heat-conducting intermediate layer against the sensor holder device by a spring force and to establish a heat conduction path across the heat-conductive intermediate layer in the process.

Furthermore, the present invention provides a camera system for a motor vehicle, which has a module device as recited in one of the descriptions and embodiments herein; a camera electronics system for the conversion of signals, which is integrated on a main board and coupled to the image sensor of the module device and is developed to convert signals received from the image sensor into image information; and a camera housing, which is developed to accommodate the module device and the main board and has an adjustment recess, which accommodates the retaining spring device and secures the module device inside the camera housing.

In addition, the present invention provides a retaining spring device, which is able to be linked to a base region of a sensor holder device and configured to press an image sensor with a heat-conducting intermediate layer against a sensor holder device, and in so doing, establish a heat conduction path across the heat-conducting intermediate layer in so doing.

The idea of the present invention consists of improving the heat transfer between an image sensor and a radiation surface of a cooling body which serves as heat sink. The sensor holder device is pressed against the image sensor with the aid of a retaining spring device, utilizing a spring force of the retaining spring device.

The contact pressure is obtained by the retaining spring device, which is developed as a heat-conducting retaining spring; the heat-conducting retaining spring also creates an additional heat conduction path to the housing device, and the housing device as well as the retaining spring device themselves are provided as cooling element and/or heat sink.

Another advantage of the present invention is that the image sensor having the heat-conducting intermediate layer is pressed against the sensor holder device by a spring force, and that a heat conduction path is created in the process via the heat-conducting intermediate layer. This allows a durable fixation of a heat-coupling element, while flexibility is present at the same time in order to reduce possibly occurring mechanical stress, which is induced by temperature-related changes in length of the components of the camera system.

In this way, the mechanical tolerance chain between the optical axis of the lens and camera system and the driving axle of the motor vehicle is able to be reduced. This furthermore results in an advantageous coupling of the camera system via appropriately configured support points.

Advantageous embodiments and refinements result from the descriptions herein and from the specification, with reference to the drawings.

According to one advantageous further refinement of the present invention, the retaining spring device is configured as a flat spring, leaf spring, formed spring or as a bent wire component. This advantageously makes it possible to adapt the spring force exerted by the retaining spring device so that the image sensor having the heat-conducting intermediate layer is pressed against the sensor holder device at a predefined spring force.

According to another advantageous further refinement of the present invention, the retaining spring device includes steel, spring steel, stainless steel, non-ferrous metal, a fiber composite material, or a glass-fiber-reinforced plastic. This advantageously enables a cost-effective production of the retaining spring device.

According to another advantageous further refinement of the present invention, a three-point support between the sensor holder device and the housing device is realized by three support elements. The module device is therefore supportable without play.

According to one additional advantageous further refinement of the present invention, the image sensor includes light-sensitive electronic components and is developed as a CCD image sensor.

According to an additional advantageous further refinement of the present invention, the at least one connection element of the sensor holder device is developed as a precise opening. This allows the module device and the camera system to be installed in an uncomplicated manner.

According to an additional advantageous further refinement of the present invention, the retaining spring device is provided to form a heat-conduction path from the image sensor to the housing device.

According to an additional advantageous further refinement of the present invention, the retaining spring device is provided as a cooling element for heat radiation of the waste heat of the heat-producing image sensor.

According to another advantageous further refinement of the present invention, the camera system also has a disc-type holder, which is coupled to the camera unit and configured to connect the camera system to the motor vehicle.

The above embodiments and developments may be combined as desired if such a combination appears useful.

Additional possible embodiments, further refinements and implementations of the present invention also include combinations of features of the present invention not explicitly mentioned above or below with regard to the exemplary embodiments. In particular, one skilled in the art will also add individual aspects as improvements or supplementations to the respective basic form of the present invention.

Additional features and advantages of specific embodiments of the present invention result from the following description with reference to the appended drawing.

BRIEF DESCRIPTION OF THE DRAWINGS

FIG. 4 shows a schematic illustration of adjustment devices and an inner opening of a sensor holder device according to a further specific embodiment of the invention.

FIG. 5c shows a schematic representation of a retaining spring device according to another specific embodiment of the present invention.

FIG. 5d shows a schematic representation of a module device for a camera system according to a further specific embodiment of the present invention.

DETAILED DESCRIPTION

Unless stated otherwise, identical or functionally equivalent elements, features and components have been provided with the same reference symbols in the figures of the drawings.

It is furthermore understood that components and elements in the figures are not necessarily depicted true to scale with respect to one another for reasons of clarity and comprehensibility.

Figure 1:
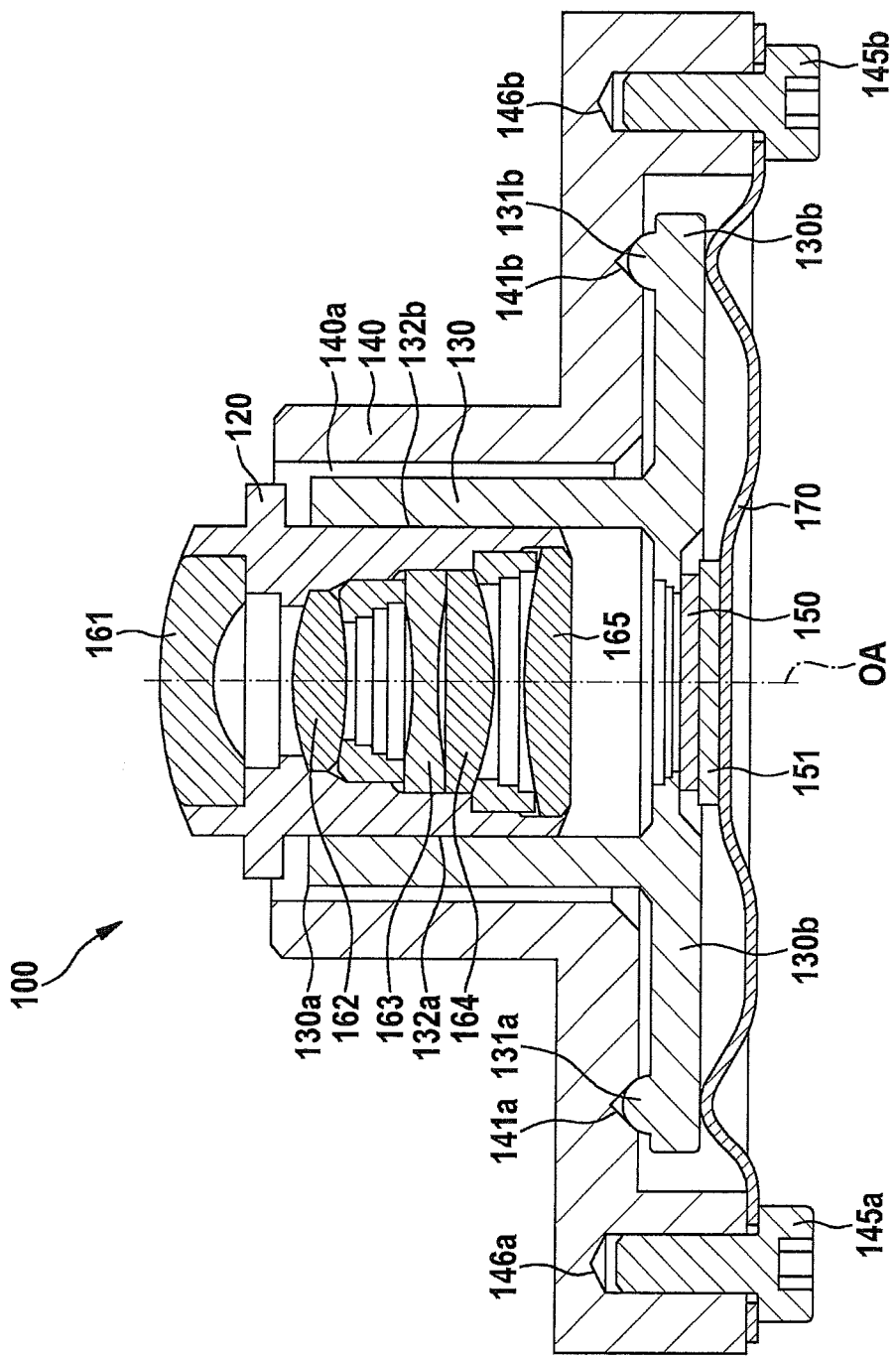
FIG. 1 shows a schematic representation of a module device for a camera system according to one specific embodiment of the present invention.

FIG. 1 shows a schematic representation of a module device for a camera system according to one specific embodiment of the present invention.

A module device 100 for a camera system includes a housing device 140, a sensor holder device 130, a lens apparatus 120, and a retaining spring device 170.

Housing device 140, for example, has an inner opening 140a and is configured to allow an adjustment of an installation position of module device 100 in a motor vehicle.

Sensor holder device 130, for instance, has an upper region 130a and a base region 130b and is coupled to housing device 140 via at least one support element 131a-131c. In addition, sensor holder device 130 is configured to accommodate an image sensor 150, for instance.

Moreover, housing unit 140 is provided with at least one adjustment device 141a-141c to accommodate the at least one support element 131a-131c.

For example, image sensor 150 is configured as a sensor for recording two-dimensional images by a light-induced electrical signal generation, e.g., as a CCD sensor or as CCD image sensors, or as CMOS sensor having color-sensitive sensors disposed next to or on top of one another. CCD means a "charge-coupled device".

Lens apparatus 120, for example, is coupled to sensor holder device 130 in upper region 130a via at least one connection element 132a, 132b, and furthermore set up to generate an optical image on image sensor 150. Lens apparatus 120, for instance, has a multitude of optical lenses 161, 162, 163, 164, 165. Lenses 161, 162, 163, 164, 165 form a lens in the form of an optical lens system having an optical axis OA.

Retaining spring device 170 is coupled to base region 130b of sensor holder device 130, for example, and configured to press image sensor 150 against sensor holder device 130. Retaining spring device 170 may be developed to be pressed against base region 130b of sensor holder device 130.

For example, a heat-conducting intermediate layer 151 is developed between retaining spring device 170 and image sensor 150, which enables heat-conducting contacting of image sensor 150 at low mechanical stressing of the surface of image sensor 150.

Using at least one connection device 145a, 145b, retaining spring device 170 is able to be coupled to base region 130b of sensor holder device 130. Base region 130b may be provided with corresponding notched elements 146a, 146b for this purpose.

The at least one connection device 145a, 145b is developed as a screw connection, for example. In the same way, the at least one connection device 145a, 145b is able to be developed as a rivet or clamping connection or as some other mounting arrangement.

Figure 2:
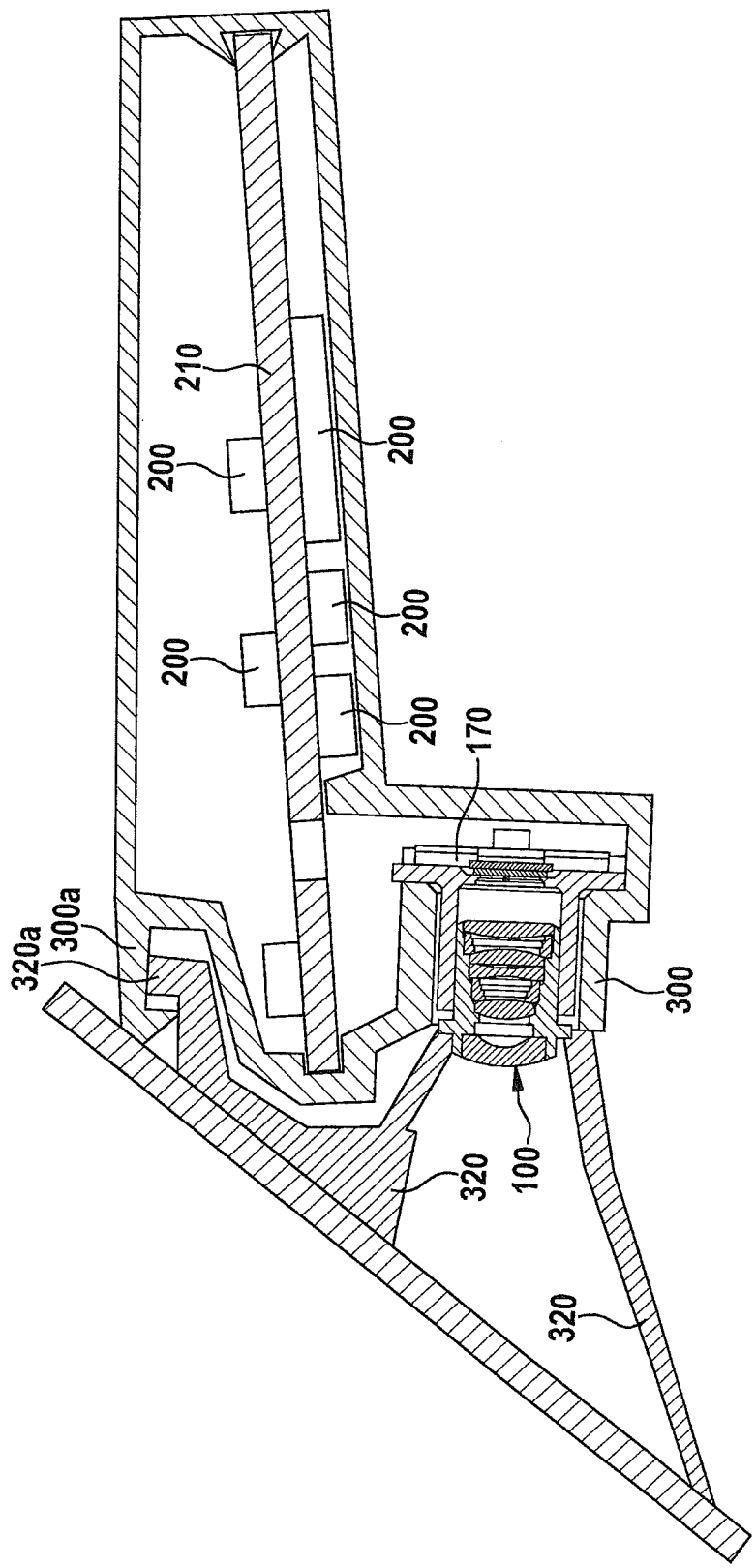
FIG. 2 shows a schematic representation of a camera system according to another specific embodiment of the present invention.

FIG. 2 shows a schematic representation of a camera system according to another specific embodiment of the present invention.

The camera system for a motor vehicle includes a module device 100, a camera electronics system 200, and a camera housing 300.

Module device 100 includes housing device 140, sensor holder device 130, lens apparatus 120, and retaining spring device 170.

Sensor holder device 130 is developed from a thermoplastic material or some other plastic material, for example, which is able to be deformed within a specific temperature range; it is provided with a patterned metallic coating, for instance, via which image sensor 150 is contactable by way of bond wiring.

Camera electronics system 200 is set up for a signal conversion, integrated on a main board 210, coupled to image sensor 150 of module device 100, and configured to convert signals received from image sensor 150 into image information.

Camera housing 300 is developed to accommodate module device 100 and main board 210 and includes a retaining mount for installing the camera system.

Module device 100 is secured in place on the front window of the motor vehicle with the aid of window mount 320, for example. Adjustment pins 320a seated in support seats 300a adjust camera housing 300 in relation to the motor vehicle. Retaining spring device 170 adjusts the module device in relation to camera housing 300.

Housing device 140 of module device 100 may be permanently connected to camera housing 300.

The electrical contacting of image sensor 150 is accomplished by wire bonds with main board 210.

The mechanical coupling of camera housing 300 to window mount 320 may take the form of clips, bonding, clamping or screw connections. A position determination is made via adjustment device 141a-141c in conjunction with support elements 131a-131c, which are developed as 3-point support, for instance.

Figure 3A:
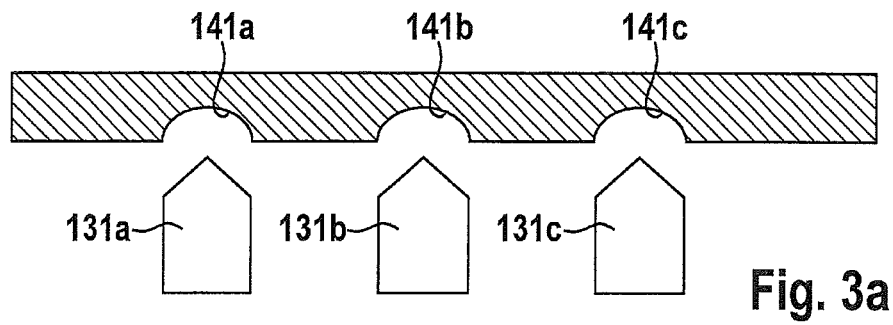
FIGS. 3a, 3b, and 3c shows three schematic representations of adjustment devices and associated support elements according to three additional specific embodiments of the invention.
Figure 3B:
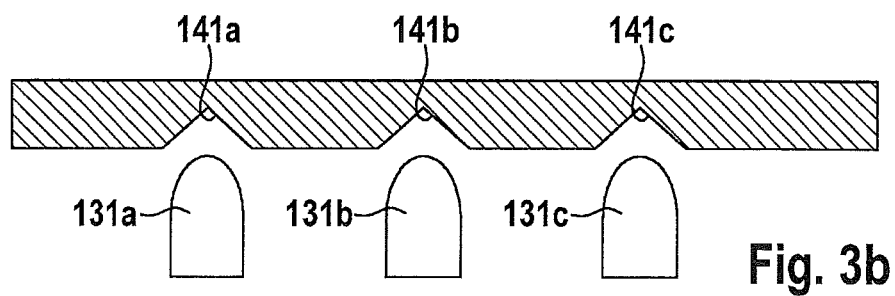
Figure 3C:
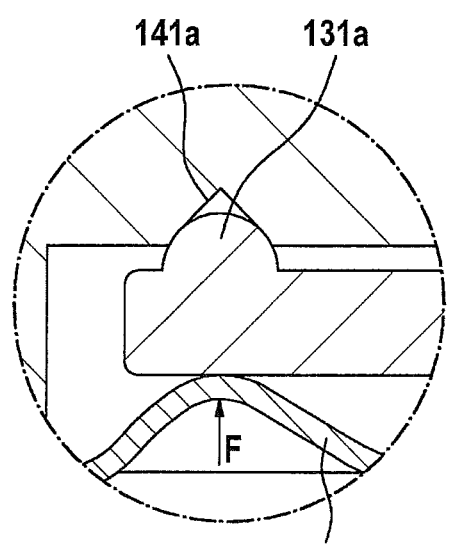

FIGS. 3a, 3b and 3c show three schematic representations of adjustment devices and associated support elements according to three additional specific embodiments of the present invention.

Adjustment devices 141a-141c, as shown in FIG. 3a, are developed as spherical recesses, for example, and provided to accommodate the at least one conical support element 131a-131c.

Adjustment devices 141a-141c, as shown in FIG. 3b, are developed as recesses in the form of a notch, for example, and provided to accommodate the at least one support element 131a-131c having a spherical surface.

Adjustment device 141a, as shown in FIG. 3c, is developed as a spherical recess, for example, and provided to accommodate the at least one conical support element 131a.

FIG. 3c illustrates the location of sensor holder device 130 where retaining spring 170 exerts a contact pressure F on conical support element 131a of sensor holder device 130 in order to press conical support element 131a against spherical adjustment device 141a.

The use of appropriately developed support elements 131a-131c and associated adjustment devices 141a-141c makes it possible to achieve a self-adjustment of module device 100, especially a self-adjustment of the position of sensor holder device 130 in relation to the position of housing device 140, this being accomplished by a contact pressure F generated by retaining spring device 170.

Because of contact pressure F generated in this manner, it is possible to shift sensor holder device 130 and housing device 140 into the particular position that allows a maximum expansion of retaining spring device 170.

FIG. 4 shows a schematic illustration of adjustment devices 141a-141c and an inner opening 143 of a sensor holder device 130 according to one further specific embodiment of the invention.

In the specific embodiment of sensor holder device 130 shown in FIG. 4, adjustment devices 141a-141c are realized in the form of a V-trough structure. An inner opening 143 of sensor holder device 130 allows the accommodation of lens apparatus 120.

Figure 5A:
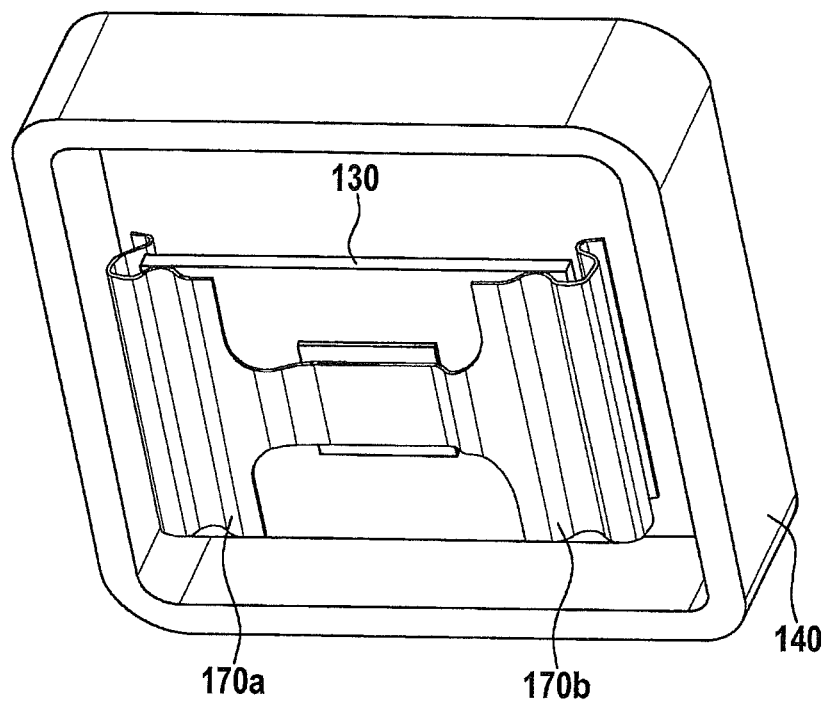
FIG. 5a shows a schematic representation of a module device for a camera system according to another specific embodiment of the present invention.

FIG. 5a shows a schematic representation of a module device for a camera system according to another specific embodiment of the present invention.

The module device includes sensor holder device 130, housing device 140, and retaining spring device 170.

Sensor holder device 130, housing device 140 and lens apparatus 120 are furthermore developed as a three-dimensional cast circuit support, a molded interconnect device (MID).

Figure 5B:
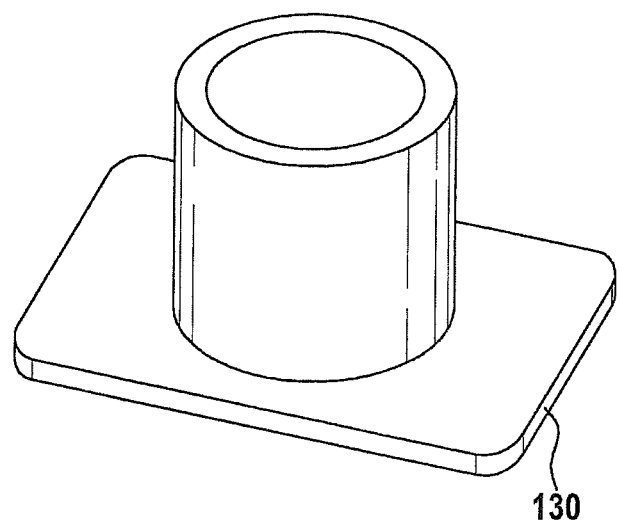
FIG. 5b shows a schematic representation of a sensor holder device according to another specific embodiment of the present invention.
Figure 6:
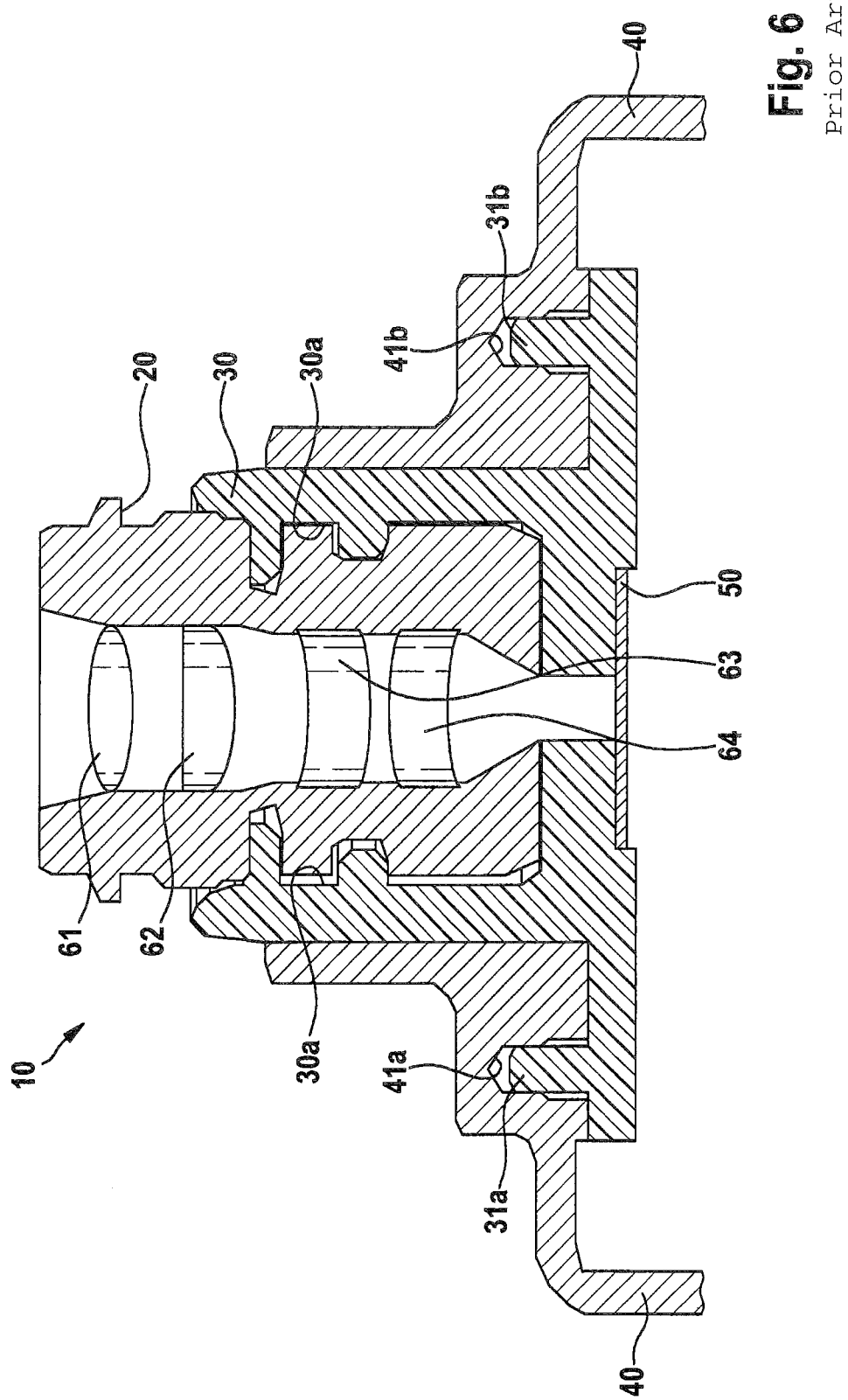
FIG. 6 shows an exemplary illustration of a camera module according to the related art.

FIG. 5b shows a schematic representation of a sensor holder device according to another specific embodiment of the present invention.

Sensor holder device 130 is developed in one piece, for instance, but it may also consist of multiple pieces.

FIG. 5c shows a schematic representation of a retaining spring device according to another specific embodiment of the present invention.

Retaining spring device 170 is configured as a leaf spring, for example, and formed by a flat metal band that is prestressed in the form of an arch. Retaining spring device 170 could include steel, spring steel, stainless steel, non-ferrous metal, a fiber composite material or a fiber-glass reinforced plastic.

FIG. 5d shows a schematic representation of a module device for a camera system according to a further specific embodiment of the present invention.

Housing device 140 is developed as a three-dimensional cast formed part, for example.

Although the present invention was described above with reference to exemplary embodiments, it is not limited to these, but may be modified in numerous ways.

What is claimed is:

1. A module device for a camera system, comprising:
 a housing device having an inner opening to allow an adjustment of an installation position of the module device in a motor vehicle;

a sensor holder device, which has an upper region and a base region and is coupled to the housing device via at least one support element and to accommodate an image sensor;

a lens apparatus, which is coupled to an interior surface of the sensor holder device in the upper region via at least one portion of the lens apparatus forming a connection element, and is set up to generate an optical image on the image sensor; and a retaining spring device which is coupled to an exterior surface of the base region of the sensor holder device and configured to press the image sensor with a heat-conducting intermediate layer against the base region of the sensor holder device by a spring force and to thereby form a heat-conduction path across the heat-conducting intermediate layer, wherein the retaining spring device consists of at least one of a flat spring, a leaf spring, a form spring, and a bent wire part, wherein the retaining spring device is configured to generate a contact pressure which presses the sensor holder device against the housing device.

2. The module device of claim 1, wherein the retaining spring device includes one of steel, spring steel, stainless steel, non-ferrous metal, a fiber composite material, and a fiber-glass reinforced plastic.

3. The module device of claim 1, wherein a three-point support is between the sensor holder device and the housing device with the aid of three support elements.

4. The module device of claim 1, wherein the image sensor includes light-sensitive electronic components and is developed as a CCD image sensor.

5. The module device of claim 1, wherein the at least one connection element of the sensor holder device provides an accurate opening.

6. The module device of claim 1, wherein the retaining spring device is provided to establish a heat-conducting path from the image sensor to the housing device.

7. The module device of claim 1, wherein the retaining spring device is a cooling element for the heat radiation of the waste heat of the heat-producing image sensor.

8. The module device of claim 1, wherein the contact pressure is configured to be exerted on the at least one support element.

9. The module device of claim 1, wherein the housing device is provided with at least one adjustment device, wherein the at least one adjustment device is configured to accommodate the at least one support element.

10. The module device of claim 9, wherein the contact pressure is exerted on the at least one support element to press the at least one support element against the at least one adjustment device.

11. A camera system for a motor vehicle, comprising a module device for the camera system, including:

a housing device having an inner opening to allow an adjustment of an installation position of the module device in the motor vehicle;

a sensor holder device, which has an upper region and a base region and is coupled to the housing device via at least one support element and to accommodate an image sensor;

a lens apparatus, which is coupled to an interior surface of the sensor holder device in the upper region via at least one portion of the lens apparatus forming a connection element, and is set up to generate an optical image on the image sensor; and a retaining spring device which is coupled to an exterior surface of the base region of the sensor holder device and configured to press the image sensor with the heat-conducting intermediate layer against the base region of the sensor holder device by a spring force and to thereby form a heat-conduction path across the heat-conducting intermediate layer;

a camera electronics system for signal conversion, the camera electronics system being integrated on a main board, coupled to the image sensor of the module device to convert signals received from the image sensor into image information; and a camera housing to accommodate the module device and the main board and which includes an adjustment recess, to accommodate the retaining spring device and to fixate the module device within the camera housing, wherein the retaining spring device consists of at least one of a flat spring, a leaf spring, a form spring, and a bent wire part, wherein the retaining spring device is configured to generate a contact pressure which presses the sensor holder device against the housing device.

12. The camera system of claim 11, further comprising:

a window mount, which is coupled to the camera housing to connect the camera system to the motor vehicle.

13. The camera system of claim 11, wherein the contact pressure is configured to be exerted on the at least one support element.

14. The camera system of claim 11, wherein the housing device is provided with at least one adjustment device, wherein the at least one adjustment device is configured to accommodate the at least one support element.

15. The camera system of claim 14, wherein the contact pressure is exerted on the at least one support element to press the at least one support element against the at least one adjustment device.

16. A retaining spring device, comprising:

a retaining spring arrangement which is coupled to an exterior surface of a base region of a sensor holder device to press an image sensor with a heat-conducting intermediate layer against the base region of the sensor holder device and to thereby form a heat-conduction path across the heat-conducting intermediate layer, wherein an interior surface of the sensor holder device is coupled to a lens apparatus via at least one portion of the lens apparatus forming a connection element, wherein the retaining spring arrangement consists of at least one of a flat spring, a leaf spring, a form spring, and a bent wire part, wherein the retaining spring device is configured to generate a contact pressure which presses the sensor holder device against a housing device.

17. The retaining spring device of claim 16, wherein the contact pressure is configured to be exerted on the at least one support element.

18. The retaining spring device of claim 16, wherein the housing device is provided with at least one adjustment device, wherein the at least one adjustment device is configured to accommodate the at least one support element.

19. The retaining spring device of claim 18, wherein the contact pressure is exerted on the at least one support element to press the at least one support element against the at least one adjustment device.

* * * * *